United States Patent
Hunt et al.

(10) Patent No.: US 11,849,673 B2
(45) Date of Patent: Dec. 26, 2023

(54) CYLINDER LOCK SYSTEM

(71) Applicant: CNH Industrial America LLC, New Holland, PA (US)

(72) Inventors: Cory D. Hunt, Millersville, PA (US); Joshua Harmon, Leola, PA (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 825 days.

(21) Appl. No.: 16/738,715

(22) Filed: Jan. 9, 2020

(65) Prior Publication Data

US 2020/0217104 A1 Jul. 9, 2020

Related U.S. Application Data (60) Provisional application No. 62/790,160, filed on Jan. 9, 2019.

(51) Int. Cl.
*F15B 15/26* (2006.01)
*A01D 41/14* (2006.01)

(52) U.S. Cl.
CPC .......... *A01D 41/145* (2013.01); *F15B 15/261* (2013.01)

(58) Field of Classification Search
CPC ..... A01D 41/145; A01D 75/20; F15B 15/261; F15B 15/26
See application file for complete search history.

(56) References Cited

U.S. PATENT DOCUMENTS

| 2,580,100 | A | 12/1951 | Johansen et al. |
| 2,994,544 | A | 8/1961 | Wolf |
| 3,799,036 | A | 3/1974 | Slaughter |
| 4,340,158 | A * | 7/1982 | Ford ................ B05B 11/106 222/384 |
| 4,529,215 | A | 7/1985 | Strand |
| 7,201,259 | B2 | 4/2007 | Knaust |
| 8,931,246 | B2 | 1/2015 | Dilts |
| 9,131,638 | B2 | 9/2015 | Fay, II |
| 9,554,500 | B2 | 1/2017 | Smith et al. |
| 10,145,395 | B2 * | 12/2018 | Stuaan ............... F15B 15/26 |

FOREIGN PATENT DOCUMENTS

| DE | 102016119251 A1 | 4/2018 |
| EP | 2508773 A1 | 10/2012 |
| GB | 608704 | 9/1948 |

OTHER PUBLICATIONS

Extended European Search Report for Application No. EP 20151041.9 dated May 12, 2020 (six pages).

* cited by examiner

*Primary Examiner* — Kenneth Bomberg
*Assistant Examiner* — Daniel S Collins
(74) *Attorney, Agent, or Firm* — Peter K. Zacharias (57) ABSTRACT

An agricultural system that includes a cylinder and a rod that moves axially in and out of the cylinder to raise and lower a header. A cylinder lock system controls movement of the rod. The cylinder lock system includes a cap-end fixture that couples to the cylinder and receives the rod. A rod-end fixture couples to an end of the rod. The system includes a lock piston. The lock piston includes a protrusion. The lock piston rotates about the rod and selectively couples the protrusion to the cap-end fixture to lock and unlock the rod-end fixture to the cap-end fixture.

18 Claims, 10 Drawing Sheets

CYLINDER LOCK SYSTEM

BACKGROUND

The present disclosure relates generally to agricultural equipment.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, such as by using a header. The header may cut the agricultural crops and transport the cut crops using a belt system to a processing system of the combine. In order to transport the harvester between fields, the header is lifted and then locked in a raised position to avoid contact with the ground (e.g., roads). Locking the header in a raised position and then unlocking the header to lower it may be a time consuming process.

BRIEF DESCRIPTION

In one embodiment, an agricultural system that includes a cylinder and a rod that moves axially in and out of the cylinder to raise and lower a header. A cylinder lock system controls movement of the rod. The cylinder lock system includes a cap-end fixture that couples to the cylinder and receives the rod. A rod-end fixture couples to an end of the rod. The system includes a lock piston. The lock piston includes a protrusion. The lock piston rotates about the rod and selectively couples the protrusion to the cap-end fixture to lock and unlock the rod-end fixture to the cap-end fixture.

In another embodiment, a cylinder lock system includes a cylinder and a rod that moves axially in and out of the cylinder to raise and lower a header. A latch pin couples to an agricultural implement. A bar rotatingly couples to the agricultural implement and to an end of the rod. A dog rotatingly couples to the bar and to the latch pin. The bar rotates in response to retraction of the rod to rotate the dog about the latch pin between locked and unlocked positions.

A cylinder lock system that includes a cap-end fixture that couples to a cylinder and receives a rod. A rod-end fixture couples to an end of the rod. The cylinder lock system includes a lock piston. The lock piston includes a protrusion. The lock piston rotates about the rod and selectively couples the protrusion to the cap-end fixture to lock and unlock the rod-end fixture to the cap-end fixture.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
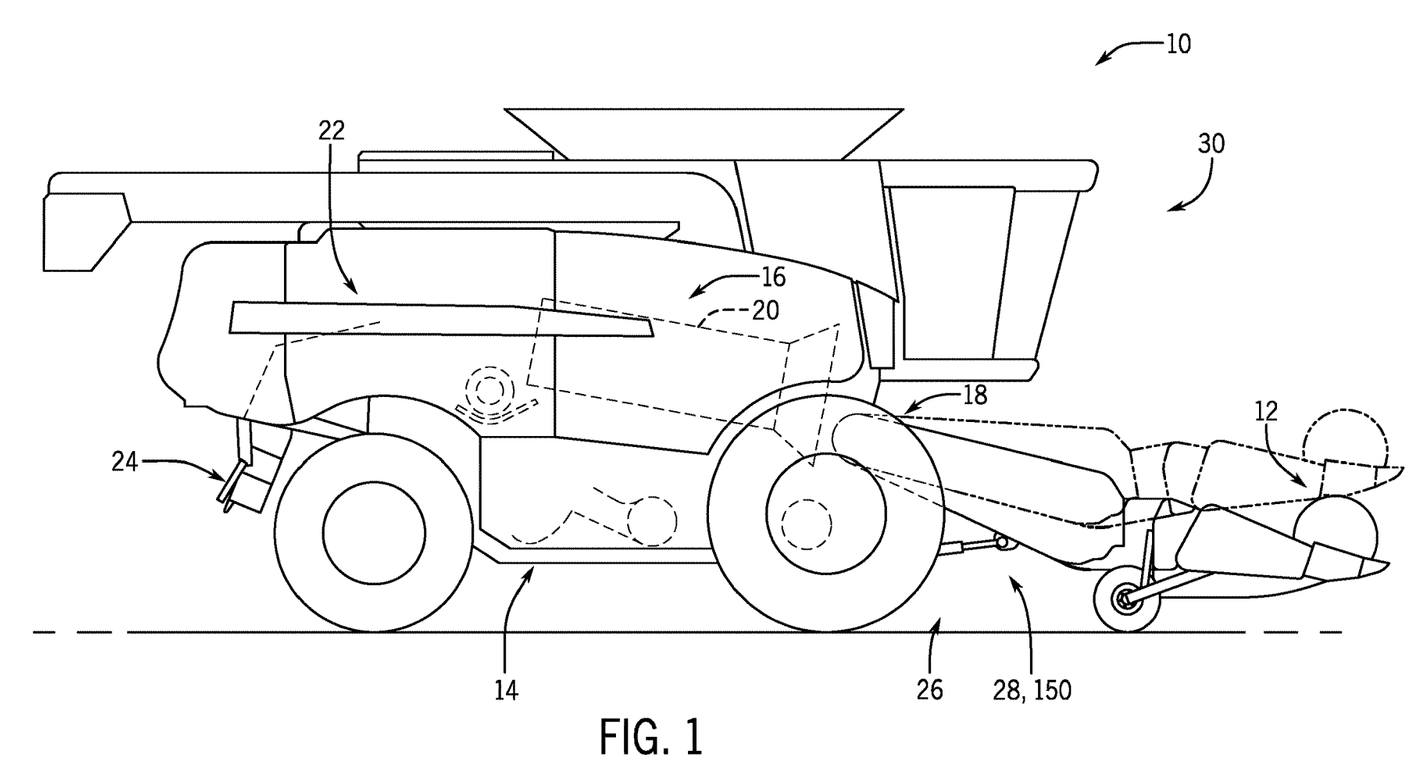
FIG. 1 is a side view of an agricultural harvester having a header, according to an embodiment of the disclosure.

Turning to the drawings, FIG. 1 is a side view of an embodiment of an agricultural harvester 10 having a header 12. The agricultural harvester 10 includes a chassis 14 configured to support the header 12 and an agricultural crop processing system 16. The header 12 is configured to cut crops and to transport the cut crops toward an inlet 18 of the agricultural crop processing system 16 for further processing of the cut crops. The agricultural crop processing system 16 receives cut crops from the header 12 and separates desired crop material from crop residue. For example, the agricultural crop processing system 16 may include a thresher 20 having a cylindrical threshing rotor that transports the crops in a helical flow path through the harvester 10. In addition to transporting the crops, the thresher 20 may separate certain desired crop material (e.g., grain) from the crop residue, such as husks and pods, and enable the desired crop material to flow into a cleaning system located beneath the thresher 20. The cleaning system may remove debris from the desired crop material and transport the desired crop material to a storage compartment within the harvester 10.

The crop residue may be transported from the thresher 20 to a crop residue handling system 22, which may remove the crop residue from the harvester 10 via a crop residue spreading system 24 positioned at the aft end of the harvester 10.

The agricultural header 12 may be raised or lowered relative to the surface of the ground depending on the mode of operation of the harvester 10. As illustrated, one or more piston cylinders 26 (e.g., hydraulic piston cylinders) may couple to the harvester 10 (e.g., chassis 14) and to the header 12. The piston cylinder 26 enables lifting and lowering of the header 12 depending on the mode of operation of the harvester 10. During harvesting operations, the piston cylinder 26 lowers the header 12 into contact with the ground enabling the header 12 to harvest crops. After harvesting in a particular field, an operator may transport the harvester 10 to another location, such as a storage location or to another field. The piston cylinder 26 enables the operator to lift the header 12 out of contact with the ground in a transportation mode. The harvester 10 may then be driven to another location without contact between the header 12 and the ground. To block movement of the header 12 from the transport position to the harvesting position, the harvester 12 includes a cylinder lock system 28. In other words, the cylinder lock system 28 blocks the piston cylinder 26 from lowering the header 12 from a raised position to a lowered position. As will be explained below, an operator may automatically lock the header 12 in the raised/transport position with the cylinder lock system 28 by only actuating the piston cylinder 26. As a result, the operator may remain in a harvester cabin 30 to transition and lock the header 12 in a transportation mode and to again unlock and lower the header 12 into a harvesting mode. The rapid transition of the header 12 between a harvesting mode to a transport mode and back to a harvesting mode may enhance the efficiency of the harvesting process.

Figure 2:
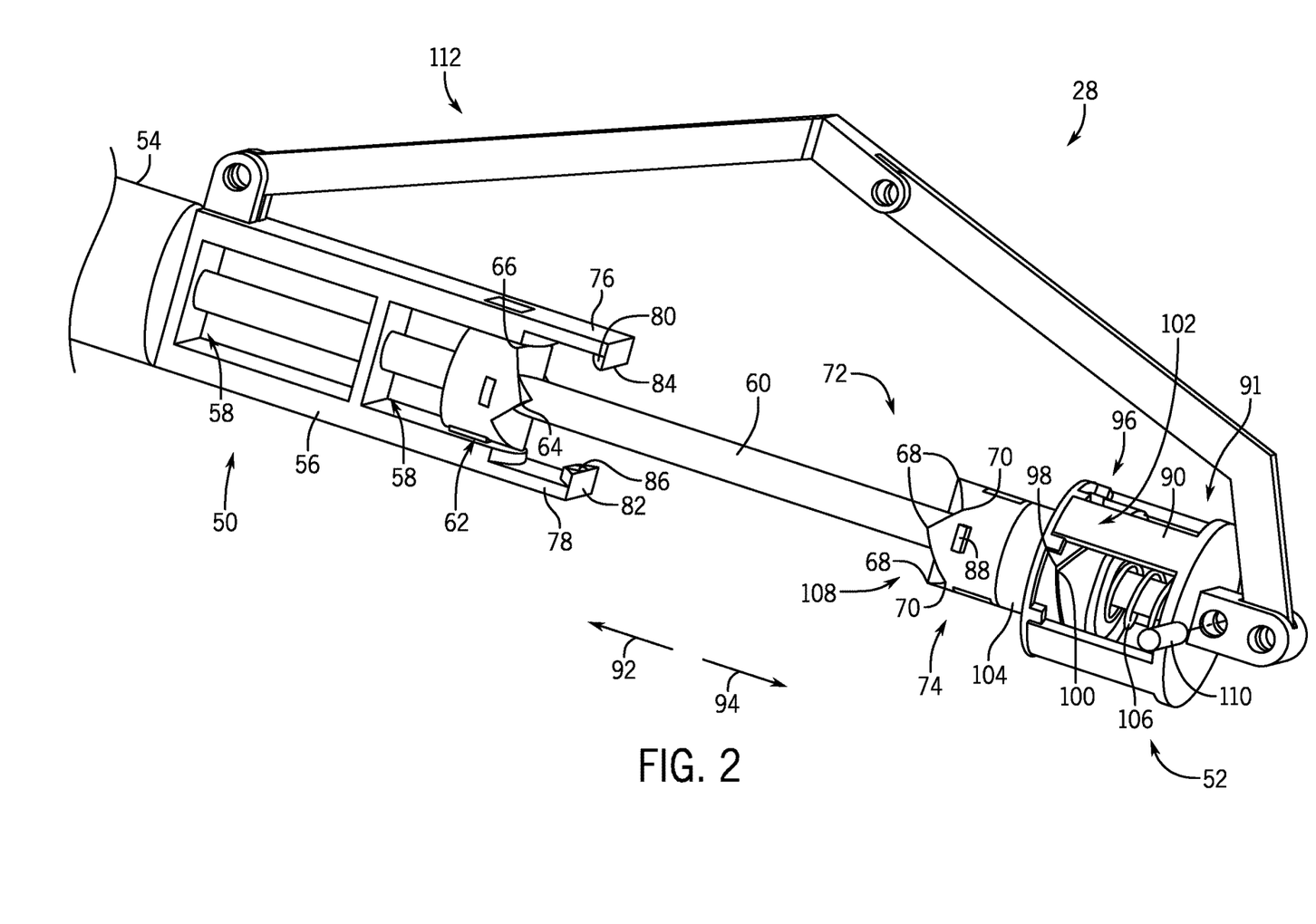
FIG. 2 is a perspective view of a cylinder lock system that may be employed with the agricultural harvester of FIG. 1, according to an embodiment of the disclosure.

FIG. 2 is a perspective view of a cylinder lock system 28 that may be employed with the agricultural harvester 10 of FIG. 1. The cylinder lock system 28 includes a cap-end fixture 50 and a rod-end fixture 52. In some embodiments, the cap-end fixture 50 may couple to a cylinder 54 of the piston cylinder 26. The cap-end fixture 50 includes a frame 56 with one or more apertures 58 that enable a rod 60 of the piston cylinder 26 to extend through the cap-end fixture 50. The frame 56 supports a first contact face 62 that defines a plurality of protrusions 64 and recesses 66. The protrusions 64 and recesses 66 may form a set of teeth that engage corresponding protrusions 68 and recesses 70 on a second contact face 72 of a lock piston 74. The frame 56 may also include opposing side walls 76 and 78 that include respective protrusions 80 and 82. The protrusions 80 and 82 include respective recesses 84 and 86. As will be explained below, recesses 84 and 86 on the protrusions 80 and 82 are configured to receive locking lugs 88 (e.g., protrusions) on the lock piston 74 to block movement of the rod 60. In some embodiments, the lock piston 74 may include recesses that receive protrusions on the frame 56 of the cap-end fixture 50.

The rod-end fixture 52 similarly includes a frame 90. The frame 90 defines an aperture 91 that enables the lock piston 74 to slide in and out of the frame 90 in axial directions 92 and 94 during operation of the cylinder lock system 28. In addition to supporting the lock piston 74, the frame 90 defines a plurality of protrusions 96 and recesses 98. These extend about an inner circumference of the frame 90 that defines the aperture 91 (e.g., extend circumferentially) and are configured to engage corresponding protrusions 100 and recesses 102 on an exterior surface 104 (e.g., outer circumferential surface) of the lock piston 74. The frame 90 of the rod-end fixture 52 also supports one or more springs 106 within the aperture 91. As will be explained below, the spring 106 facilitates operation of the cylinder lock system 28 by providing a biasing force on the lock piston 74 in axial direction 92. As illustrated, the rod 60, of the piston cylinder 28, extends through an aperture 108 in the lock piston 74. After passing through the lock piston 74, the rod 60 extends through the spring 106 and the frame 90. The rod 60 couples to the frame 90 with a pin 110 that passes through an aperture 111 in the rod 60. In this way, the pin 110 blocks separation of the rod 60 from the rod-end fixture 52. In some embodiments, the cap-end fixture 50 and the rod-end fixture 52 may couple to a linkage 112 that couples to the harvester 10.

Figure 3:
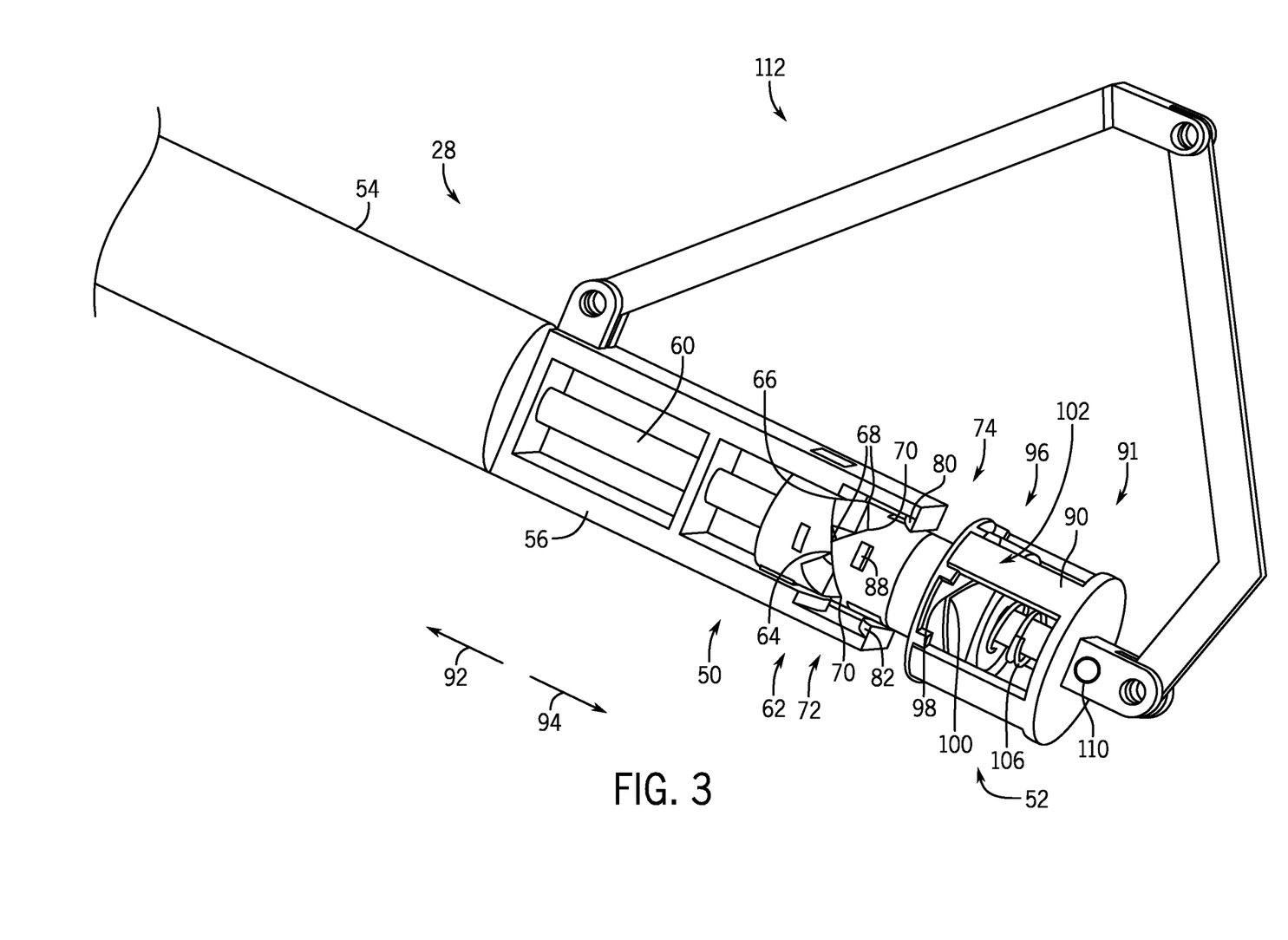
FIG. 3 is a perspective view of a cylinder lock system of FIG. 2 with the rod retracted to a first position, according to an embodiment of the disclosure.

FIG. 3 is a perspective view of a cylinder lock system 28 in a first position with the rod 60 retracted into the cylinder 54. As the rod 60 retracts in direction 92, the rod 60 pulls the rod-end fixture 52 and the lock piston 74 towards the cap-end fixture 50. As the rod 60 continues to retract in direction 92, the first contact face 62 on the cap-end fixture 50 engages/contacts the second contact face 72 on the lock piston 74. As illustrated, the protrusions 64 on the first contact face 62 are circumferentially offset from the protrusions 68 on the second contact face 72. This enables the protrusions 64 on the first contact face 62 to enter the recesses 70 on the second contact face 72, and the protrusions 80 on the second contact face 72 to enter the recesses 66 on the first contact face 62.

Figure 4:
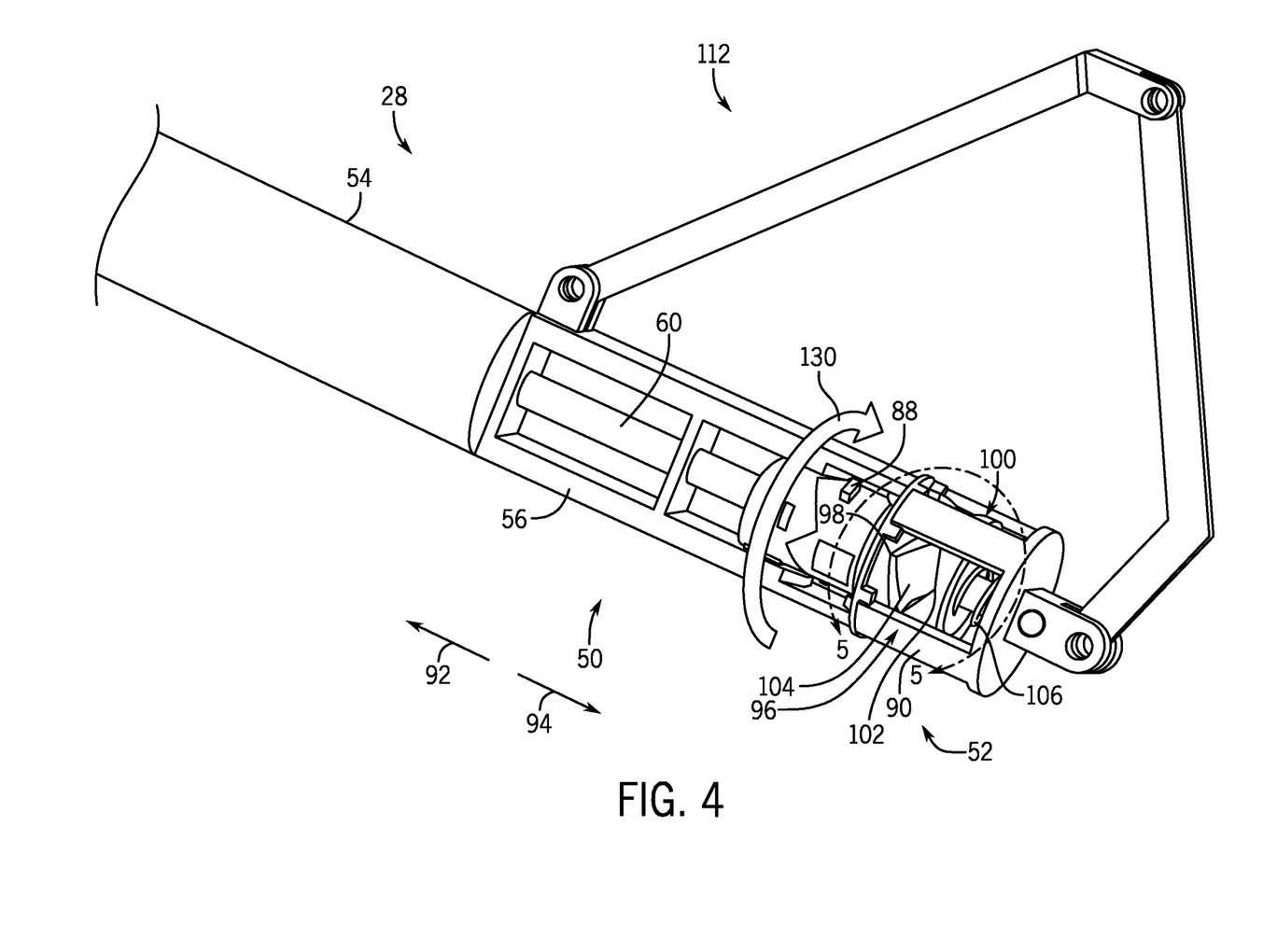
FIG. 4 is a perspective view of a cylinder lock system of FIG. 2 with the rod retracted to a second position, according to an embodiment of the disclosure.

FIG. 4 is a perspective view of a cylinder lock system 28 with the rod 60 retracted to a second position. As illustrated, in the second position the lock piston 74 continues to move in axial direction 92 until the protrusions 64 on the first contact face 62 rest within recesses 70 on the second contact face 72, and the protrusions 68 on the second contact face 72 rest in the recesses 66 on the first contact face 62. The axial sliding motion of the protrusions 64 and 68 contacting and moving past each other drives rotation of the lock piston 74 in circumferential direction 130 about the rod 60. The rotation of the lock piston 74 simultaneously rotates the lugs 88.

Figure 5:
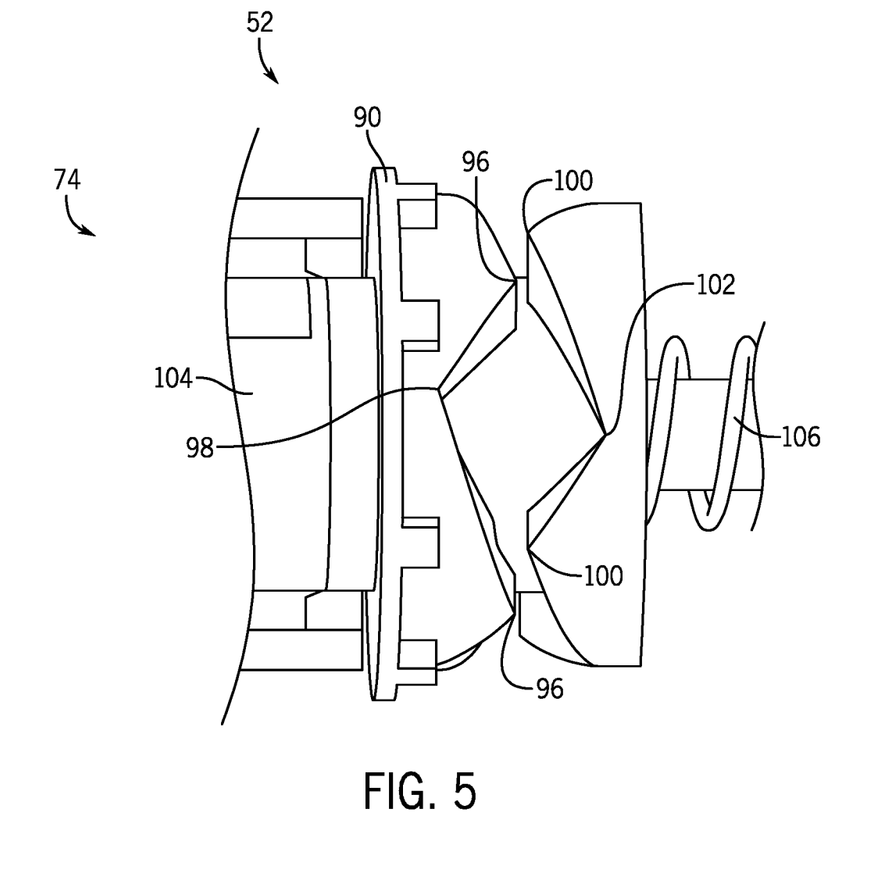
FIG. 5 is a partial side view of a cylinder lock system within line 5-5 of FIG. 4, according to an embodiment of the disclosure.

As the rod 60 moves in axial direction 92, the rod 60 pulls the frame 90 of the rod-end fixture 52 compressing the spring 106 between the lock piston 74 and the frame 90 of the rod-end fixture 52. Compression of the spring 106 enables axial separation of the protrusions 100 and recesses 102 on the lock piston 74 from the protrusions 96 and recesses 98 on frame 90. Furthermore, as the lock piston 74 rotates, in response to contact between the protrusions 64 and the protrusions 68, the protrusions 100 and recesses 102 on the exterior surface 104 of the lock piston 74 rotate with respect to the protrusions 96 and recesses 98 on the frame 90 (see FIG. 5).

Figure 6:
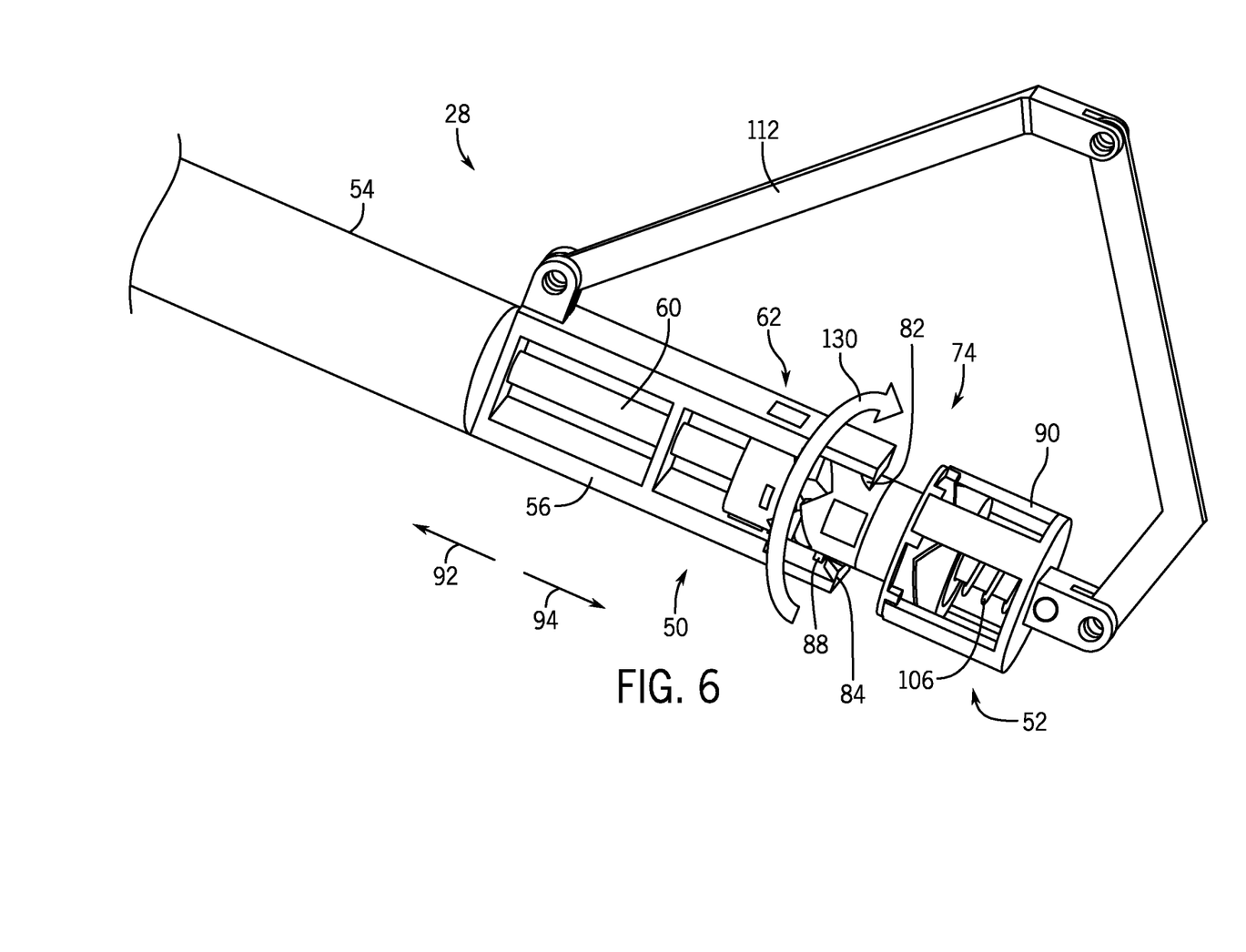
FIG. 6 is a perspective view of a cylinder lock system of FIG. 2 with the rod in a third position, according to an embodiment of the disclosure.

FIG. 6 is a perspective view of a cylinder lock system 28 with the lock piston 74 in a third position. In the third position, the rod 60 extends in direction 94, or in other words transitions from the position in FIG. 4 (e.g., a fully retracted position). For example, a leak down of the hydraulic pressure may occur enabling to the rod to move in axial direction 94. In some embodiments, the operator may release/drive the rod 60 (e.g., release by command) enabling the rod 60 to move in axial direction 94. The movement of the rod 60 enables the spring 106 to drive the lock piston 74 in axial direction 92. As the lock piston 74 moves in direction 92, the protrusions 100 on the exterior surface 104 contact the protrusions 96 on the frame 90. The contact between the protrusions 100 on the lock piston 74 and the protrusions 96 on the rod-end fixture 52 drive rotation of the lock piston 74 in circumferential direction 130. As the lock piston 74 rotates, the lugs 88 align with recesses 84, 86 in the protrusions 82, 84 of the cap-end fixture 50. In this position, the cylinder lock system 28 is in a locked position. In other words, the lugs 88 block axial movement of lock piston 74 and thus the rod-end fixture 52 and the rod 60 in direction 94.

Figure 7:
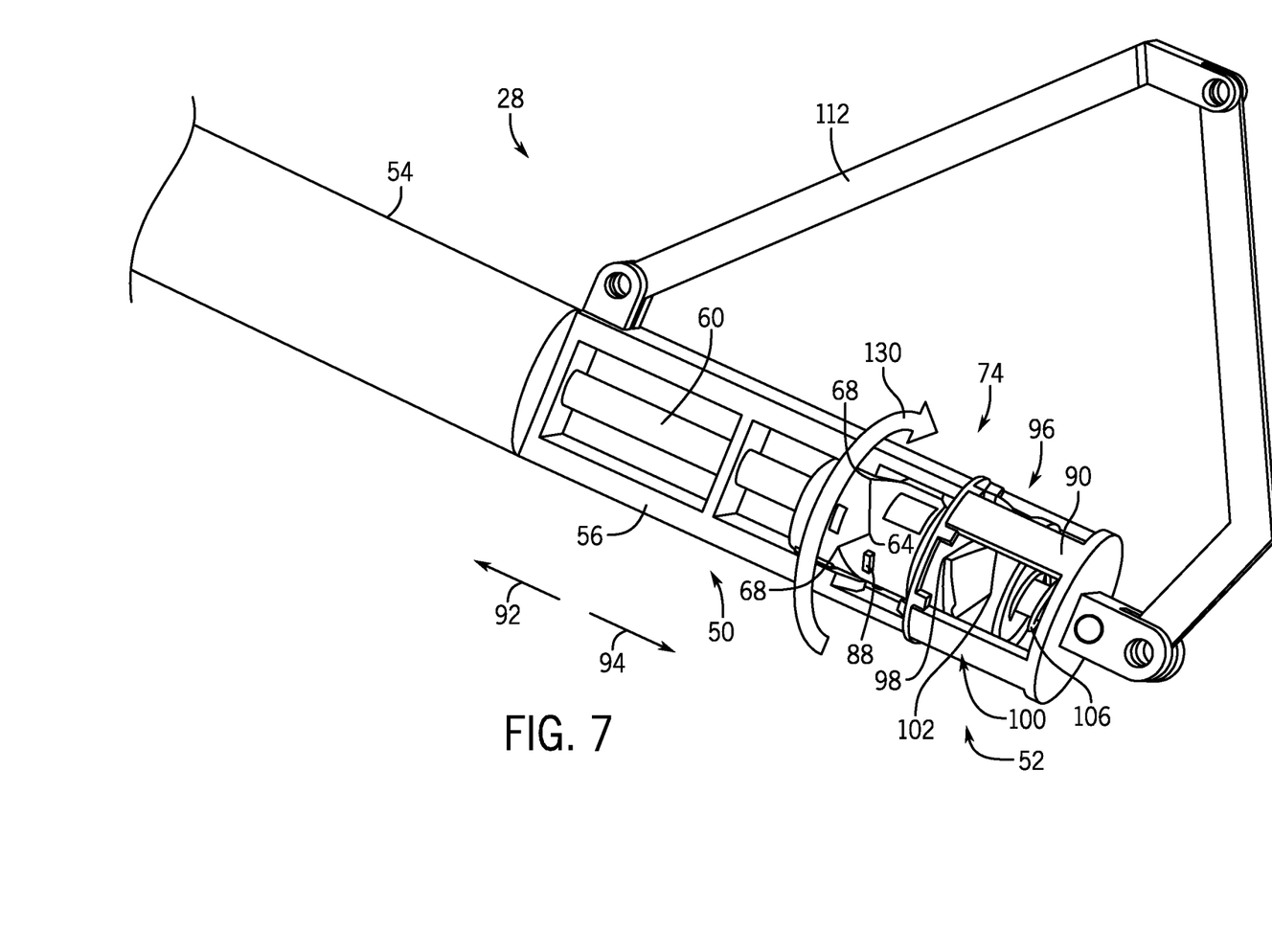
FIG. 7 is a perspective view of a cylinder lock system of FIG. 2 with the rod retracted to the second position, according to an embodiment of the disclosure.

FIG. 7 is a perspective view of the cylinder lock system 28 with the rod 60 retracted to the second position. In order to unlock the cylinder lock system 28, the rod 60 is again retracted in axial direction 92 until the protrusions 64 on the first contact face 62 rest within recesses 70 on the second contact face 72, and the protrusions 68 on the second contact face 72 rest in the recesses 66 on the first contact face 62. This axial movement of the lock piston 74 drives rotation of the lock piston 74 in circumferential direction 130 as the protrusions 64 contact the protrusions 68. As the lock piston 74 moves axially in direction 92 and rotates in circumferential direction 130, the lugs 88 exit the recesses 84, 86 and rotate out of alignment with the protrusions 80, 82 of the frame 56. In other words, the cylinder lock system 28 transitions from a locked state/position to an unlocked state/position.

As the rod 60 moves in axial direction 92, the rod 60 also pulls the frame 90 of the rod-end fixture 52, which compresses the spring 106 between the lock piston 74 and the frame 90 of the rod-end fixture 52. Compression of the spring 106 enables axial separation of the protrusions 100 and recesses 102 on the lock piston 74 from the protrusions 96 and recesses 98 on frame 90. Furthermore, the rotation of the lock piston 74 generated by the contact between the protrusions 64 on the first contact face 62 and the protrusions 68 on the second contact face 72 enables rotation of the protrusions 100 and recesses 102 on the exterior surface 104 of the lock piston 74 with respect to the protrusions 96 and recesses 98 on the frame 90 of the rod-end fixture 52 (see FIG. 5).

Figure 8:
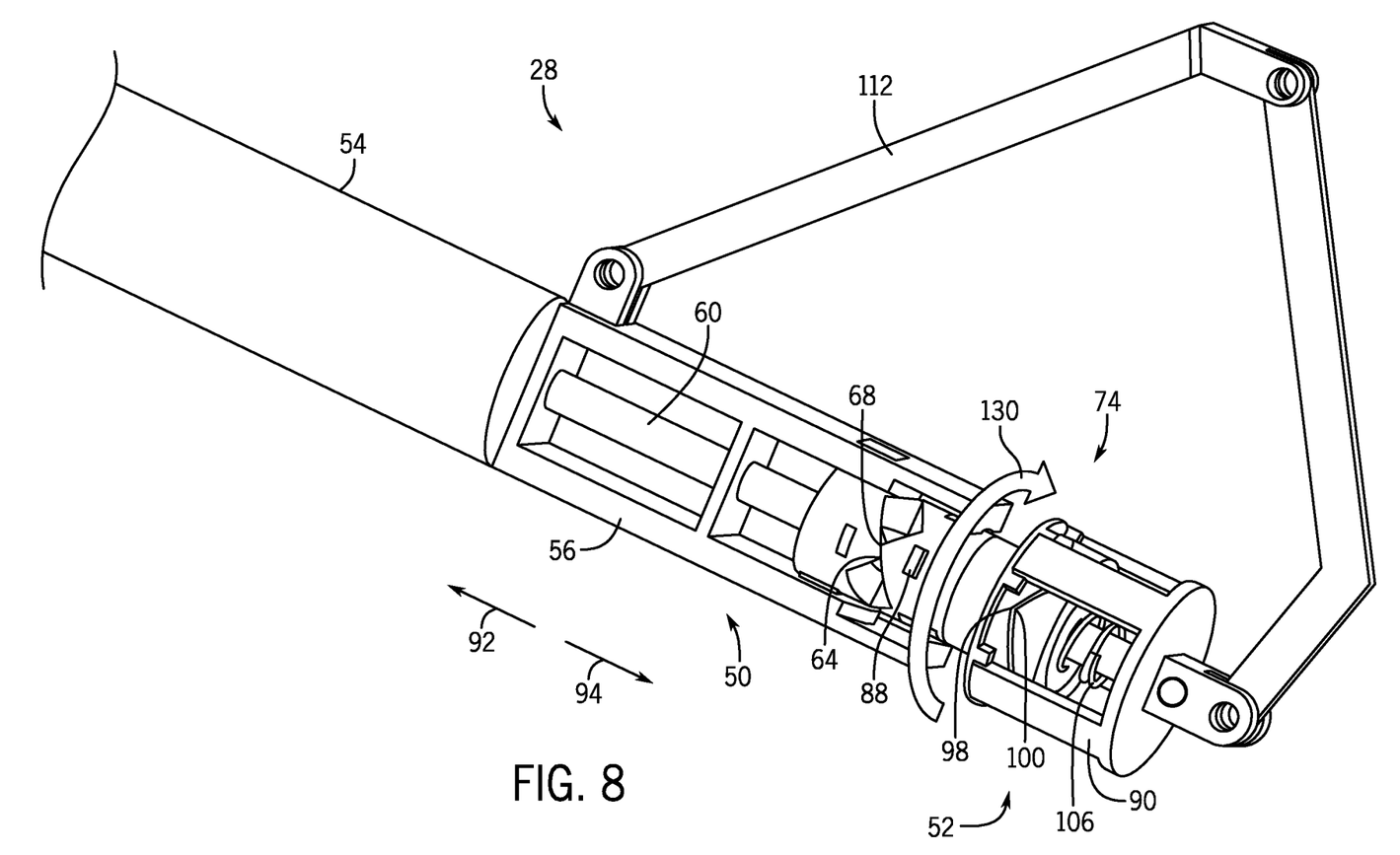
FIG. 8 is a perspective view of a cylinder lock system of FIG. 2 with the rod returning to the third position, according to an embodiment of the disclosure.

FIG. 8 is a perspective view of the cylinder lock system 28 with the rod 60 in the third position. After the lugs 88 are out of alignment with the protrusions 80, 82, the rod 60 may extend in axial direction 94. In other words, the force used to retract the rod 60 may be released. The release of the rod 60 enables the spring 106 to drive the lock piston 74 in axial direction 92. As the lock piston 74 moves in direction 92, the protrusions 100 on the exterior surface 104 contact the protrusions 96 on the frame 90. The contact between the protrusions 100 on the lock piston 74 and the protrusions 96 on the rod-end fixture 52 drive rotation of the lock piston 74 in circumferential direction 130. As the lock piston 74 rotates, the lugs 88 are misaligned with the recesses 84, 86 in the respective protrusions 80, 82 of the cap-end fixture 50. In this position, the cylinder lock system 28 is in an unlocked position and prepared for the transition to a locked position when the rod 60 is again retracted in direction 92.

Figure 9:
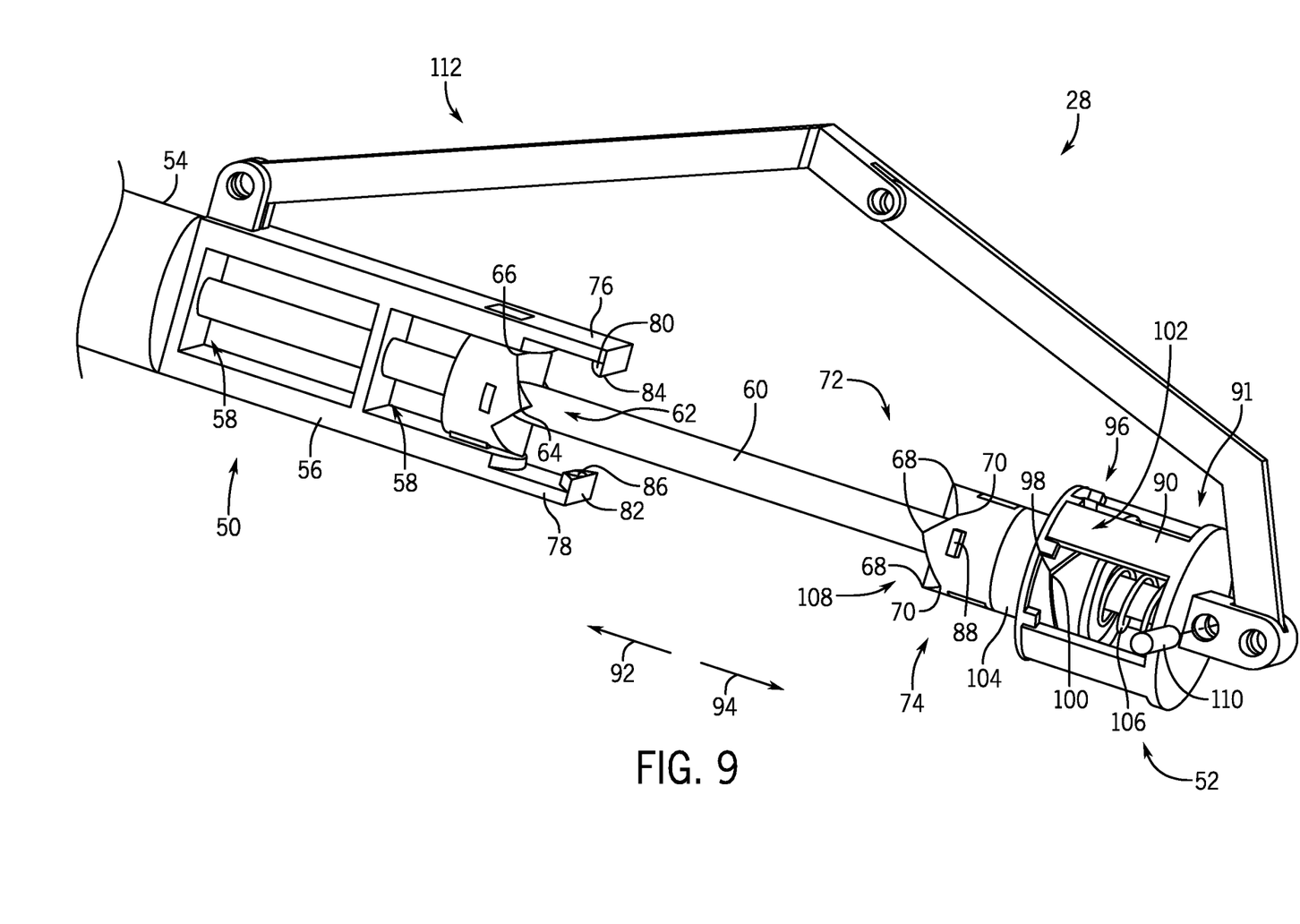
FIG. 9 is a perspective view of a cylinder lock system with the rod extended, according to an embodiment of the disclosure.

FIG. 9 is a perspective view of the cylinder lock system 28 with the rod 60 extended. After unlocking the lock piston 74 from the cap-end fixture 50 the rod 60 may again be extended in direction 94 to lower the header 12 and transition the harvester 10 from a travel mode of operation to a harvesting mode of operation.

Figure 10:
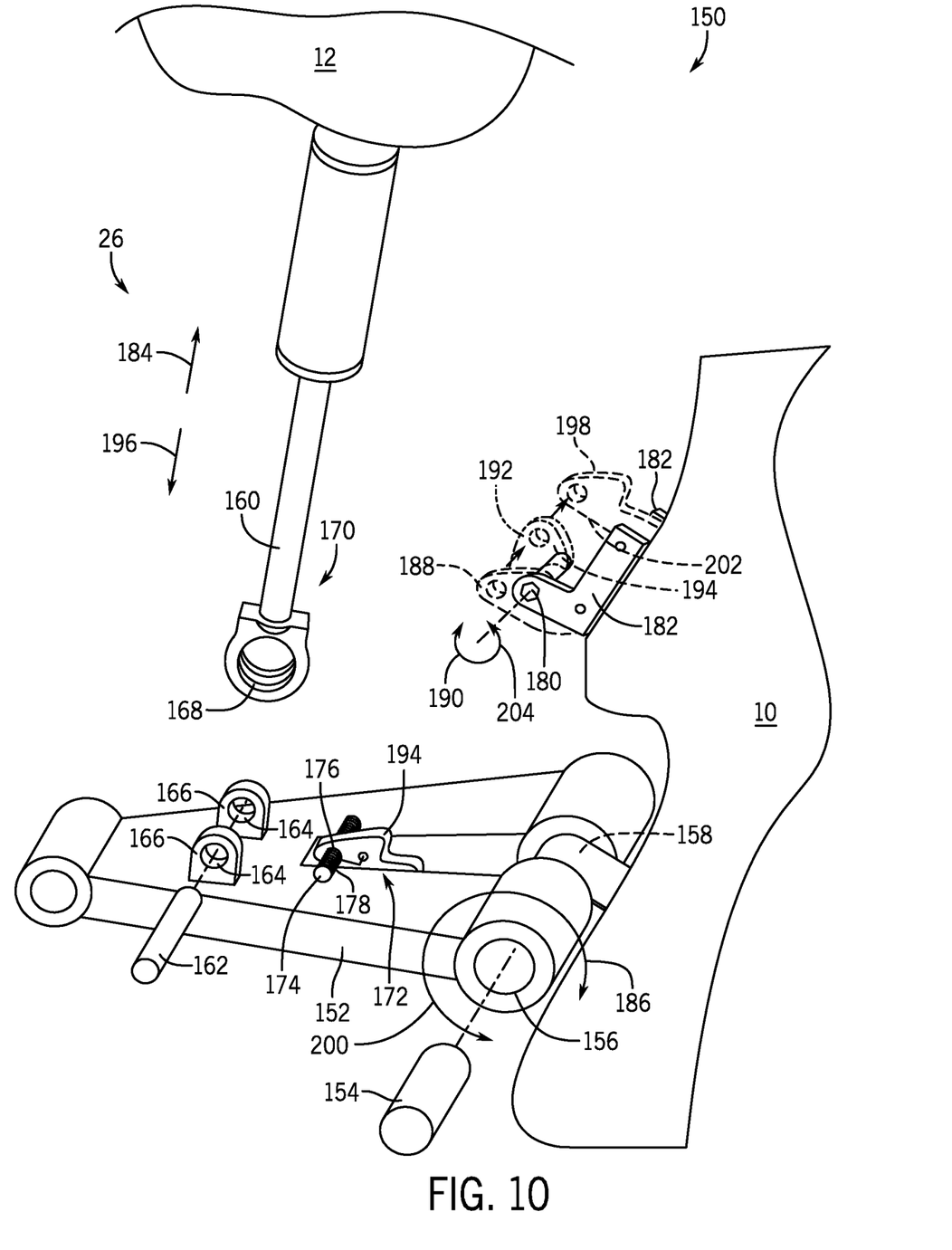
FIG. 10 is a perspective view of a cylinder lock system, according to an embodiment of the disclosure.

FIG. 10 is a perspective view of a cylinder lock system 150 that enables locking of the piston cylinder 26 by actuation of the piston cylinder 26. As explained above, the harvester 10 may transition between harvesting and transportation modes of operation. In the harvesting modes of operation, the header 12 is in a lowered position to enable the harvester 10 to harvest crops. In the transportation mode of operation, the header 12 is raised to block and/or reduce contact between the header 12 and the ground. The cylinder lock system 150 includes a bar 152 (e.g., an A-bar) that rotatingly couples to the harvester 10 with pin 154. For example, the pin 154 may extend through one or more apertures 156 in the bar 152 and one or more apertures 158 in the harvester 10. The connection formed by the pin 154 creates a pivot point about which the bar 152 may rotate in response to retraction and extension of the rod 160 of the piston cylinder 26. The rod 160 likewise rotatingly couples to the bar 152 with a pin 162. The pin 162 passes through one or more apertures 164 in the bar 152. For example, one or more protrusions 166 may define the apertures 164. In order to couple the rod 160 to the bar 152, the pin 162 extends through the apertures 164 in the bar 152 and through an aperture 168 in an end 170 of the bar 152.

The bar 152 supports a dog or latch 172 that enables the locking of the header 12 in a raised position by actuating the rod 160. The dog or latch 172 couples to the bar 152 with a pin 174. The pin 174 extends through an aperture 176 in the dog or latch 172, which enables the dog or latch 172 to rotate about the pin 174. In FIG. 10 the dog 172 is biased to a first position with a spring 178 that couples to the pin 174 and to the dog 172. The dog 172 remains in this position until it contacts the latch pin 180. The latch pin 180 couples to and is supported by brackets 182 (e.g., L-shaped brackets) that couple to the harvester 10.

In operation, the header 12 is raised by retracting the rod 160. As the rod 160 retracts in direction 184, the bar 152 rotates in direction 186 about the pin 154 that couples the bar 152 to the harvester 10. As the bar 152 rotates, the dog 172 remains in the first position until it contacts the latch pin 180 illustrated by the dashed dog 188. As the rod 160 continues to retract and the bar 152 continues to rotate, the dog 188 contacts the latch pin 180. The contact force between the dog 188 and the latch pin 180 overcomes the spring force of the spring 178 enabling the dog 188 to rotate in direction 190 about the pin 174. As the dog 188 rotates about the latch pin 180, the dog 188 transition to a second or locked position illustrated by the dashed dog 192. In this position, a stop lobe or ledge 194 rests on the latch pin 180 blocking movement of the rod 160 in direction 196. In other words, the dog 188 locks the header 12 in a raised position. In order to again lower the header 12, the rod 160 is driven or retracted in direction 184. The retraction again causes the bar 152 to rotate in direction 186, which further drives rotation of the dog 172 about the latch pin 180. The continued rotation and raising of the dog 172 enables the dog 172 to slide over and clear the latch pin 180. Once the dog 172 clears the latch pin 180, the spring 178 returns the dog 172 to its original position (e.g., the first position) illustrated with dashed line 198. In this position, the rod 160 may again extend in direction 196 to lower the header 12, because as the bar 152 rotates in direction 200 the latch pin 180 contacts a rear surface 202 of the dog 172. Contact between the rear surface 202 of the dog 172 and the latch pin 180 rotates the dog 172 in direction 204 as the dog 172 slides over the latch pin 180. Again once the dog 172 clears the latch pin 180, the spring 178 biases the dog 172 to the original position or first position as the bar 152 rotates in direction 200 and is lowered away from the latch pin 180 in direction 196.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural system, comprising:
   a cylinder;
   a rod configured to move axially in and out of the cylinder; and
   a cylinder lock system configured to control movement of the rod and/or cylinder, the cylinder lock system comprising:
   a cap-end fixture configured to couple to the cylinder and configured to receive the rod;
   a rod-end fixture configured to couple to an end of the rod; and
   a lock piston, the lock piston comprising a protrusion, wherein the lock piston is configured to rotate in a circumferential direction about a longitudinal axis of the rod and selectively couple the protrusion to the cap-end fixture to lock and unlock the rod-end fixture to the cap-end fixture;
   wherein the cap-end fixture comprises a first contoured contact face configured to engage a second contoured face on the lock piston to rotate the lock piston.

2. The agricultural system of claim 1, wherein the cap-end fixture comprises a recess configured to receive the protrusion on the lock piston.

3. The agricultural system of claim 1, wherein the rod-end fixture comprises a frame that defines an aperture that receives the lock piston, wherein the lock piston is configured to move axially in and out of the aperture.

4. The agricultural system of claim 3, comprising a spring within the aperture of the rod-end fixture.

5. The agricultural system of claim 1, wherein the rod-end fixture comprises a first contoured contact surface configured to engage a second contoured surface on the lock piston to rotate the lock piston.

6. The agricultural system of claim 1, comprising a linkage coupled to the cap-end fixture and to the rod-end fixture.

7. The agricultural system of claim 1, wherein the cylinder is a hydraulic cylinder.

8. A cylinder lock system, comprising:
   a cylinder;
   a rod coupled to the cylinder, wherein the cylinder and/or the rod are configured to move relative to each other;
   a latch pin configured to couple to an agricultural implement;
   a bar configured to rotatingly couple to the agricultural implement and to an end of the rod;
   a dog configured to rotatingly couple to the bar and to the latch pin; and
   wherein the bar is configured to rotate in response to retraction of the rod and/or the cylinder to rotate the dog about the latch pin between locked and unlocked positions.

9. The cylinder lock system of claim 8, wherein the cylinder is a hydraulic cylinder.

10. The cylinder lock system of claim 8, wherein the bar is an A-shaped bar.

11. The cylinder lock system of claim 8, wherein the dog comprises a lobe configured to contact the latch pin to block extension of the rod.

12. The cylinder lock system of claim 8, comprising a spring configured to bias the dog against the latch pin in the locked position.

13. The cylinder lock system of claim 8, comprising a spring configured to bias the dog to an unlocked position.

14. A cylinder lock system, comprising:
   a cap-end fixture configured to couple to a cylinder and configured to receive a rod;
   a rod-end fixture configured to couple to an end of the rod; and
   a lock piston, the lock piston comprising a protrusion, wherein the lock piston is configured to rotate in a circumferential direction about a longitudinal axis of the rod and selectively couple the protrusion to the cap-end fixture to lock and unlock the rod-end fixture to the cap-end fixture;
   wherein the cap-end fixture comprises a first contoured contact face configured to engage a second contoured face on the lock piston to rotate the lock piston.

15. The cylinder lock system of claim 14, wherein the cap-end fixture comprises a recess configured to receive the protrusion on the lock piston.

16. The cylinder lock system of claim 14, wherein the rod-end fixture comprises a frame that defines an aperture that receives the lock piston, wherein the lock piston is configured to move axially in and out of the aperture.

17. The cylinder lock system of claim 16, comprising a spring within the aperture of the rod-end fixture.

18. The cylinder lock system of claim 14, wherein rod-end fixture comprises a first contoured contact surface configured to engage a second contoured surface on the lock piston to rotate the lock piston.

* * * * *